(12) United States Patent
Rosingana et al.

(10) Patent No.: US 12,399,009 B2
(45) Date of Patent: Aug. 26, 2025

(54) AUTOMATICALLY RECONFIGURABLE INTERFACE ELECTRONIC CIRCUIT AND SENSOR INCLUDING THE INTERFACE ELECTRONIC CIRCUIT AND A MEMS TRANSDUCER

(71) Applicant: STMICROELECTRONICS S.r.l., Agrate Brianza (IT)

(72) Inventors: Paolo Rosingana, Savigliano (IT); Alessandra Maria Rizzo Piazza Roncoroni, Abbiategrasso (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 858 days.

(21) Appl. No.: 17/575,375

(22) Filed: Jan. 13, 2022

(65) Prior Publication Data

US 2022/0236059 A1     Jul. 28, 2022

(30) Foreign Application Priority Data

Jan. 25, 2021   (IT) .......................... 102021000001322

(51) Int. Cl.
*G01C 19/5776*   (2012.01)
*G01P 15/125*    (2006.01)
(52) U.S. Cl.
CPC ........ *G01C 19/5776* (2013.01); *G01P 15/125* (2013.01)

(58) Field of Classification Search
CPC .. G01C 19/5776; G01P 15/125; G06F 13/385
See application file for complete search history.

(56) References Cited

U.S. PATENT DOCUMENTS

| 9,690,361 B2 | 6/2017 | Elibol et al. |
| 10,754,414 B2 | 8/2020 | Hanson et al. |
| 2015/0131820 A1* | 5/2015 | Veneri ...................... H04R 3/00 381/174 |
| 2017/0325039 A1* | 11/2017 | Khwaja ................ H04R 29/001 |
| 2019/0300020 A1* | 10/2019 | Alexiou ............... B60N 2/5891 |

* cited by examiner

*Primary Examiner* — Ricky Go
(74) *Attorney, Agent, or Firm* — Seed Intellectual Property Law Group LLP

(57) ABSTRACT

An interface electronic circuit couplable to a first transducer that generates a first analog signal indicative of a first quantity and to a microcontroller unit, the interface electronic circuit including: a first conversion stage, which generates a first digital signal as a function of the first analog signal; a DSP stage, which includes at least one DSP unit and generates a processed signal as a function of the first digital signal; an advanced-processing stage, which detects, by execution of a processing of the processed signal, the occurrence of an target condition regarding the first quantity; and a number of registers, which store values of configuration parameters. The advanced-processing stage writes at least one subset of the registers, after detecting the occurrence of the target condition, so as to vary the values of the configuration parameters stored in the subset of registers.

19 Claims, 3 Drawing Sheets

AUTOMATICALLY RECONFIGURABLE INTERFACE ELECTRONIC CIRCUIT AND SENSOR INCLUDING THE INTERFACE ELECTRONIC CIRCUIT AND A MEMS TRANSDUCER

BACKGROUND

Technical Field

The present disclosure relates to an interface electronic circuit and to a sensor that includes the interface electronic circuit and a transducer.

Description of the Related Art

As is known, today a large number of sensors are available, which are designed to detect an extremely wide range of quantities and typically have an output in digital format.

In general, the process of acquisition of digital samples of a quantity through a corresponding sensor enables not only supply of the samples of the quantity to a unit external to the sensor (for example, a microcontroller unit), but also enables control and possible variation, during use, of one or more parameters of the sensor, in order to optimize, on the basis of the application of interest, the process of acquisition and the characteristics of the signal read (for example in terms of band, output frequency, and full scale).

BRIEF SUMMARY

The aim of the present disclosure is thus to provide an interface electronic circuit that will enable the drawbacks of the prior art to be overcome at least in part.

According to the present disclosure, an interface electronic circuit is provided, as defined in the annexed claims.

BRIEF DESCRIPTION OF THE SEVERAL VIEWS OF THE DRAWINGS

For a better understanding of the present disclosure, preferred embodiments thereof will now be described purely by way of non-limiting example, with reference to the attached drawings, wherein.

DETAILED DESCRIPTION

Figure 1:
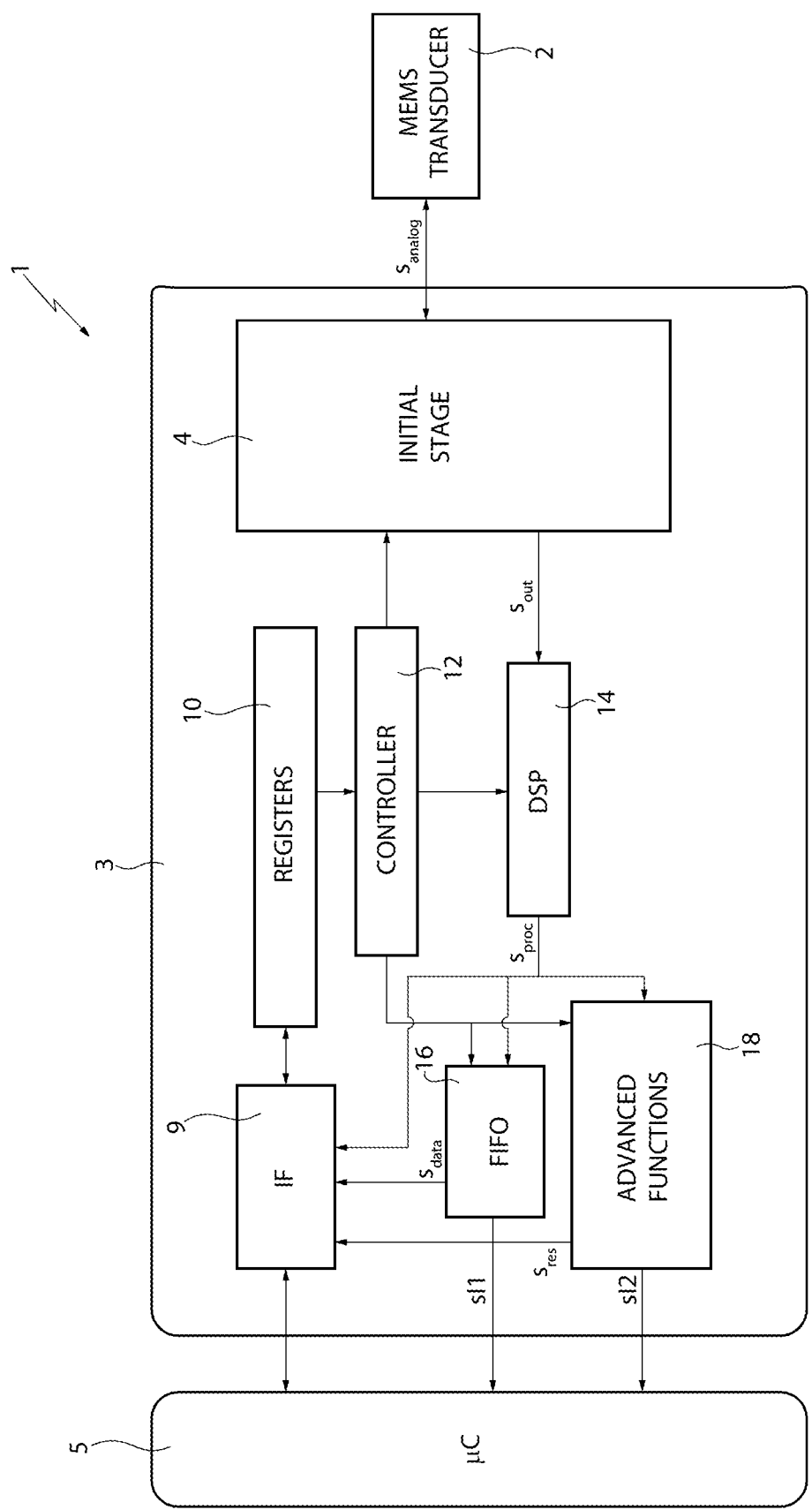
FIG. 1 shows a block diagram of an interface electronic circuit coupled to a transducer and to a microcontroller unit.

FIG. 1 shows a sensor 1, which is a MEMS (Micro-Electro-Mechanical System) sensor and comprises a MEMS transducer 2 and an interface circuit 3, the latter being a so-called ASIC (Application-Specific Integrated Circuit) and including an initial stage 4, which is electrically coupled to the MEMS transducer 2. The MEMS transducer 2 is designed to generate an analog electrical signal $s_{analog}$, indicative of the quantity that is monitored by the sensor 1. The analog electrical signal $s_{analog}$ is supplied to the initial stage 4, which carries out a first operation of processing (for example, a first filtering) of the analog electrical signal $s_{analog}$ and an analog-to-digital conversion so as to generate an output signal $s_{out}$ of a digital type, which is formed by digital samples of the aforementioned quantity.

In greater detail, the initial stage 4 includes a so-called front-end stage and an analog-to-digital converter (not illustrated). In addition, the initial stage 4 can be controlled so as to bias the MEMS transducer 2, and therefore so as to set, for example, the so-called working point of the MEMS transducer 2. Possibly, the initial stage 4 may also be able to actuate the MEMS transducer 2, i.e., drive an actuation structure present in the MEMS transducer 2 designed to move one or more elements of the MEMS transducer 2 (for example, one or more mobile masses, in the case where the MEMS transducer 2 is a gyroscope).

The interface circuit 3 may be coupled to a microcontroller unit 5 and includes: an interface module 9, a plurality of registers 10, a controller 12, a digital-signal-processing unit 14, referred to briefly hereinafter as "DSP unit 14", as well as a memory stage 16 and an advanced-processing stage 18.

The DSP unit 14 is coupled to the initial stage 4 so as to receive at input the output signal $s_{out}$. Furthermore, the DSP unit 14 is configured to carry out numeric processing of the output signal $s_{out}$, so as to generate at output a processed signal $s_{proc}$, which is of a digital type and is constituted by processed samples of the quantity. For instance, the DSP unit 14 may generate the processed signal $s_{proc}$ by (digital) filtering and/or re-sampling of the samples of the output signal $s_{out}$; possibly, assuming that the samples of the output signal $s_{out}$ have been generated with respect to a first full-scale value of the aforementioned quantity, the DSP unit 14 may moreover carry out a normalization of the sample of the processed signal $s_{proc}$ with respect to a second full-scale value, for example lower than the first full-scale value, so as to scale appropriately the gain of the output signal $s_{out}$ before supplying it to the microcontroller unit 5. In other words, the numeric processing executed of the DSP unit 14 is characterized by a number of processing parameters, which include, for example, the cut-off frequency adopted for filtering and/or the sampling frequency and/or the full scale adopted by the DSP unit 14.

The registers 10 store the values of corresponding parameters, referred to in what follows as "configuration parameters".

The controller 12 is coupled to the registers 10, to the initial stage 4, to the DSP unit 14, to the memory stage 16, and to the advanced-processing stage 18.

In particular, the controller 12 is coupled to the registers 10 so as to read the values of the configuration parameters stored in the registers 10. In addition, the controller 12 may be configured to switch on (i.e., supplying) or switch off the initial stage 4, and therefore also the MEMS transducer 2, as a function of one or more values of the configuration parameters stored in the registers 10. Furthermore, the controller 12 may be configured so as to control the initial stage 4 in order to vary the working point of the MEMS transducer 2 as a function of one or more values of the configuration parameters stored in the registers 10.

In addition, the controller 12 is configured to vary one or more of the processing parameters of the DSP unit 14 as a function of one or more values of the configuration parameters stored in the registers 10 in order to change the numeric processing performed by the DSP unit 14.

The memory stage 16 is, for example, of a RAM type and has a pair of inputs, one of which is connected to the controller 12 and the other to the output of the DSP unit 14 so as to receive the processed signal $s_{proc}$. The memory stage 16 is controlled by the controller 12, which can activate/ deactivate the memory stage 16, for example as a function of one or more values of the configuration parameters stored in the registers 10.

Once activated, the memory stage 16 stores the samples of the processed signal $s_{proc}$. Moreover, the memory stage 16 has a respective first output, which is connected to the interface module 9. For instance, the memory stage 16 may implement a so-called FIFO (first-in first-out) memory, in which case the samples of the processed signal $s_{proc}$ stored in the memory stage 6 are supplied in succession on the first output of the memory stage 16, according to the FIFO criterion. The succession of the processed samples forms a signal $s_{data}$, present on the first output of the memory stage 16.

The memory stage 16 also has a respective second output, on which it generates a first interrupt signal sI1, which is activated when the signal $s_{data}$ is effectively available, i.e., when samples of the processed signal $s_{proc}$ are effectively stored in the memory stage 16.

The advanced-processing stage 18 has a respective pair of inputs, one of which is connected to the controller 12 and the other to the output of the DSP unit 14; in this way, the advanced-processing stage 18 is controlled by the controller 12 and receives at input the processed signal $s_{proc}$. In particular, the advanced-processing stage 18 is configured to carry out, alternatively or also in parallel, a plurality of advanced processing operations on the samples of the processed signal $s_{proc}$. The advanced processing operation or operations effectively executed by the advanced-processing stage 18 is/are set by the controller 12 according to the values of one or more configuration parameters stored in the registers 10.

The advanced-processing stage 18 may, for example, implement, alternatively or in parallel, a finite-state machine (FSM) and any machine-learning technique (such as a neural network or a binary tree). For instance, assuming that the sensor 1 is an accelerometer that can be fastened to the wrist of a user, the advanced-processing stage 18 may implement a finite-state machine designed to detect, on the basis of the processed signal $s_{proc}$, the occurrence of one or more pre-set evolutions in time of the quantity detected by the sensor 1, each evolution corresponding to execution of a corresponding gesture by the user. Likewise, the advanced-processing stage 18 may implement a neural network, which receives at input the samples of the processed signal $s_{proc}$ and has been previously trained (for example, in a supervised way) to identify, on the basis of the processed signal $s_{proc}$, an operating condition from among a plurality of possible operating conditions (for example, different possible conditions of movement, used during the training step, such as a condition of rest, a condition of low-acceleration movement, and a condition of high-acceleration movement) in which the sensor 1 can operate, i.e., for carrying out an algorithm of classification of the operating condition of the sensor 1. The controller 12 may therefore govern the advanced-processing stage 18 so that, for example, it executes the finite-state machine or alternatively implements the neural network.

In general, the advanced-processing stage 18 has a first output and a second output, on which it generates, respectively, a result signal $s_{res}$, indicative of the result of the processing carried out by the advanced-processing stage 18, and a second interrupt signal sI2, which is activated when the result signal $s_{res}$ is effectively available, i.e., processing has been completed. For instance, when the advanced-processing stage 18 executes the aforementioned finite-state machine, the result signal $s_{res}$ may be indicative of the gesture detected; when the advanced-processing stage 18 executes the aforementioned neural network, the result signal $s_{res}$ may be indicative of the operating condition detected.

The second outputs of the memory stage 16 and of the advanced-processing stage 18 are connected to corresponding terminals of the microcontroller unit 5, the latter being thus able to detect, on the basis of the first interrupt signal sI1 and/or second interrupt signal sI2, whether data (i.e., samples) are present in the memory stage 16, and consequently whether the signal $s_{data}$ is available, and/or whether the advanced-processing stage 18 has terminated its own processing, and consequently whether the result signal $s_{res}$ can be read.

Following upon activation of either the first interrupt signal sI1 or the second interrupt signal sI2, the microcontroller unit 5 awakes, identifies the interrupt signal that has caused waking-up and reads, through the interface module 9, the signal $s_{data}$ or the result signal $s_{res}$, according to whether the first interrupt signal sI1 or the second interrupt signal sI2 has been activated. In addition to being coupled to the output of the memory stage 16 and to the first output of the advanced-processing stage 18, the interface module 9 may also be coupled to the output of the DSP unit 14 so as to enable the microcontroller unit 5 to read the samples of the processed signal $s_p$mc; also this latter type of reading may be carried out following upon activation of the first interrupt signal sI1.

In greater detail, both the advanced-processing stage 18 and the DSP unit 14 implement respective output registers (not illustrated), stored in which are, respectively, the current value of the result signal $s_{res}$ (until the advanced-processing stage 18 overwrites an updated value, at the end of a new processing operation) and a number of samples of the processed signal $s_{proc}$, which are overwritten by the DSP unit 14 as it calculates further samples of the processed signal $s_{proc}$. Through the interface module 9, the microcontroller unit 5 can read the output registers of the DSP unit 14 and of the advanced-processing stage 18, in addition to the memory stage 16, so as to acquire, as mentioned previously, the samples of the processed signal $s_{proc}$ available in the output register of the DSP unit 14, the current value of the result signal $s_{res}$ available in the output register of the advanced-processing stage 18, and the samples of the processed signal $s_{proc}$ stored in the memory stage 16. For this purpose, the microcontroller unit 5 and the interface module 9 may implement a communication protocol, such as the I2C protocol or the I3C protocol or the SPI protocol; at a physical level, the connection between the microcontroller unit 5 and the interface module 9 is such as to support the protocol adopted and comprises a corresponding bus.

In even greater detail, the interface module 9 is able to address, in reading, the output registers of the advanced-processing stage 18 and of the DSP unit 14, in addition to the memory stage 16 and the registers 10. Furthermore, the interface module 9 is able to address the registers 10 also in writing, as occurs, for example, in the start-up stage, where the microcontroller unit 5, through the interface module 9, can set the initial values of the configuration parameters in the registers 10.

In the event of activation of the second interrupt signal sI2, the microcontroller unit may modify, once again through the interface module 9, one or more of the values of the configuration parameters stored in the registers 10. For instance, when the result signal $s_{res}$ is indicative of the detection of execution of a gesture or of a given operating condition of the sensor 1, the microcontroller unit 5 may modify the value of at least one configuration parameter; i.e., it may write a new value in the corresponding register 10. In what follows, for brevity reference is made to the case where, following upon a variation of the value of the result signal $s_r es$, the microcontroller unit 5 varies just one configuration parameter, which will be referred to as "variable configuration parameter".

For instance, in the case where the sensor 1 is an accelerometer and the advanced-processing stage 18 implements the aforementioned neural network, what is described hereinafter may occur. Initially, the microcontroller unit 5 assigns to the variable configuration parameter a respective initial value; on the basis of this initial value of the variable configuration parameter, the controller 12 sets a corresponding first value of a processing parameter of the DSP unit 14 (for example, a first value of filtering band). The DSP unit 14 is thus configured to carry out a first type of filtering (for example, a wide-band filtering) of the output signal $s_{out}$. Following upon detection by the advanced-processing stage 18 of the aforementioned condition of movement at high acceleration, the microcontroller unit 5, through the interface module 9, assigns an updated value to the variable configuration parameter. On the basis of the updated value of the variable configuration parameter, the controller 12 assigns a corresponding second value to the aforementioned processing parameter of the DSP unit 14 (for example, a second value of filtering band). The DSP unit 14 thus becomes configured to carry out a second type of filtering (for example, a high-pass filtering) of the output signal $s_{out}$, so as to obtain optimal filtering of the output signal $s_{out}$ according to the actual conditions of use. Possibly, following upon change of value of the aforementioned variable configuration parameter, the controller 12 may likewise change the type of processing executed by the advanced-processing stage 18 (for example, so as to implement a finite-state machine, instead of the aforementioned neural network), or it may activate/deactivate the memory stage 16. Possibly, the controller 12 may switch off the initial stage 4, and thus also the MEMS transducer 2, or vary the working point of the MEMS transducer 2.

The coupling between the sensor 1 and the microcontroller unit 5 illustrated in FIG. 1 is effective for transferring to the microcontroller unit 5 the data detected by the sensor 1. However, it is characterized by a certain degree of complexity given that it envisages the need to manage the interrupt signals, as well as by relatively high consumption levels; in fact, the need to awake the microcontroller unit 5 when it is necessary to modify a configuration parameter entails high consumption levels.

In what follows, example implementations are described as regards the differences with respect to what is illustrated in FIG. 1. Elements already present in FIG. 1 are designated by the same references, except where otherwise specified. In addition, purely by way of example, it is assumed that the sensor (here designated by 101) is an accelerometer, and therefore that the samples of the output signal $s_{out}$ are acceleration samples, except where otherwise specified.

In detail, the advanced-processing stage, here designated by advanced functions 118, has a third output, which is coupled to the registers 10. Moreover, through the coupling between its own third output and the registers 10, the advanced-processing stage 118 is able to write one or more of the registers 10 directly, i.e., without any need of support by the microcontroller unit μC 5 or by the interface module IF 9. In this way, the advanced-processing stage 118 can modify directly the values of one or more configuration parameters stored in the registers 10, for example after the advanced-processing stage 118 has detected execution of a gesture or has detected a certain operating condition.

In other words, following upon detection of execution of a gesture or following upon detection of a certain operating condition, the advanced-processing stage 118 can change accordingly the value the result signal $s_{res}$ and moreover can overwrite a new value in at least one of the registers 10; e.g., it can modify the value of at least one configuration parameter so as to obtain the same benefit described with reference to FIG. 1, without the need for intervention by the microcontroller unit 5, and therefore with a noticeable reduction of the consumption levels.

The effectiveness of the solution proposed can be appreciated with reference, purely by way of example, to the ensuing first scenario of application, which for simplicity refers to the case where the advanced-processing stage 118 implements a neural network designed to detect different operating conditions and has direct access, and therefore can write, just one register 10, which stores the value of a corresponding configuration parameter, referred to as "directly writeable configuration parameter". It is moreover assumed that, initially, the microcontroller unit 5 has assigned to the directly writeable configuration parameter a respective initial value. On the basis of the initial value of the directly writeable configuration parameter, the controller 12 sets a corresponding first full-scale value for the DSP unit 14.

Following upon detection of a certain operating condition, for example, the aforementioned operating condition of high-acceleration movement, the advanced-processing stage 118, in addition to setting a corresponding value of the result signal $s_r es$, overwrites the register 10 to which it has direct access, so that the directly writeable configuration parameter will assume an updated value, different from the initial value. On the basis of the updated value of the directly writeable configuration parameter, the controller 12 sets a second full-scale value for the DSP unit 14, for example higher than the first full-scale value. In this way, the dynamics of the sensor 101 is adapted to the actual conditions of use, without any need for intervention by the microcontroller unit 5.

A second scenario of application may be the same as the one just described, but for the fact that the controller 12 is configured so as to enable or alternatively disable the memory stage FIFO Regards 16, when the directly writeable configuration parameter is equal, respectively, to the updated value or to the initial value. In this way, without any intervention by the microcontroller unit 5, the sensor 101 is configured so as to have available, in the operating condition of high-acceleration movement, an additional storage capacitance as compared to the operating conditions of rest or low-acceleration movement, where only the samples of the processed signal $s_{proc}$ stored in the output register of the DSP unit 14 are available. In this way, following upon detection of the operating condition of high-acceleration movement, the microcontroller unit 5 can acquire, after activation of the first interrupt signal sI1, all the samples stored in the memory stage 16, which correspond to a time interval that is more extensive than the one corresponding to just the samples stored in the output register of the DSP unit 14.

A third scenario of application may be the same as the first scenario, but for the fact that the controller 12 is configured so as to govern the advanced-processing stage 118 so that, when the directly writeable configuration parameter is equal to the initial value, the advanced-processing stage 118 will execute the aforementioned neural network, and so that, when the directly writeable configuration parameter is equal to the updated value, the advanced-processing stage 118 will execute (for example) a different machine-learning algorithm or a finite-state machine. In other words, variants are possible in which the controller 12 changes, following upon variation of the value of the directly writeable configuration parameter, the processing implemented by the advanced-processing stage 118.

In addition, scenarios of application are possible that are the same as the first, second, and third scenarios of application described previously, but in which overwriting of the register 10 that stores the directly writeable configuration parameter by the advanced-processing stage 118 is caused by detection of execution of a gesture, in which case the advanced-processing stage 118 may implement, for example, a finite-state machine.

Figure 2:
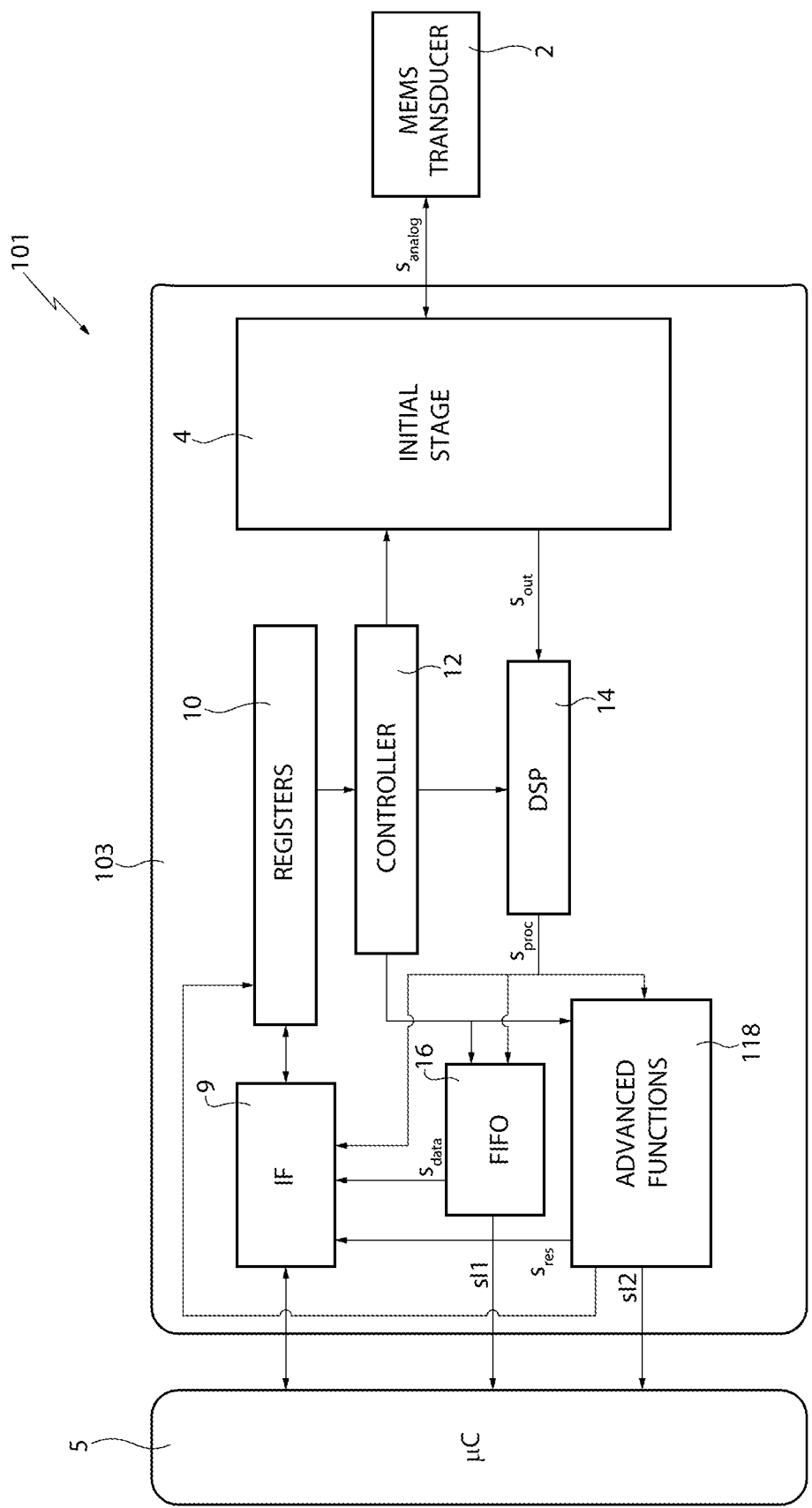
FIGS. 2 and 3 show block diagrams of embodiments of the present interface electronic circuit, coupled to transducers and to a microcontroller unit.

Irrespective of the type of algorithm implemented by the advanced-processing stage 118, a fourth scenario of application can be described with reference to the embodiment illustrated in FIG. 3, which is described with reference to the differences with respect to what is illustrated in FIG. 2.

Figure 3:
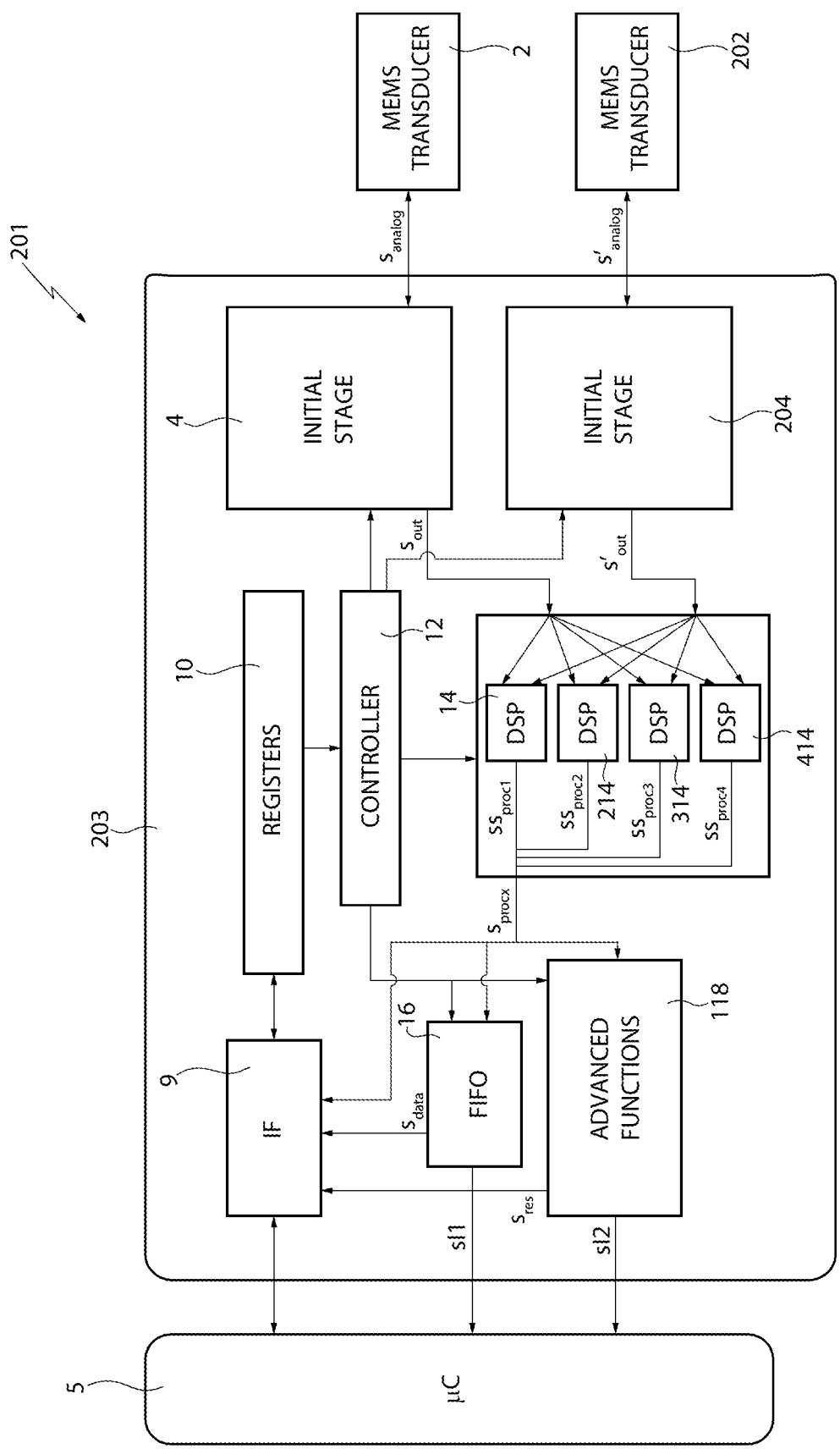

In detail, in FIG. 3 the sensor is designated by 201 and differs from the sensor 101 in that it includes, in addition to the initial stage 4 and the MEMS transducer 2 (referred to in what follows as "first initial stage 4" and "first MEMS transducer 2"), a second initial stage 204, and a second MEMS transducer 202. Furthermore, in addition to the DSP unit 14 (referred to in what follows as "first DSP unit 14"), the sensor 201 comprises a second DSP unit 214, a third DSP unit 314, and a fourth DSP unit 414, which form, together with the first DSP unit, a DSP stage 215 of a multicore type.

In detail, the second MEMS transducer 202 is coupled to the second initial stage 204 so as to supply to the latter an additional analog signal $s'_{analog}$. For instance, the first and second MEMS transducers 2, 202 may be, respectively, a MEMS accelerometer and a MEMS gyroscope so that the analog electrical signal $s_{analog}$ and the additional analog signal $s'_{analog}$ represent, respectively, an acceleration and an angular velocity.

On the basis of the additional analog signal $s'_{analog}$, the second initial stage 204 generates an additional output signal $s'_{out}$ of a digital type, which is formed by digital samples of the quantity detected by the second MEMS transducer 202 (in this example, the aforementioned angular velocity). Furthermore, the controller 12 may control the second initial stage 204 so as to bias the second MEMS transducer 202, for example to set the working point of the MEMS transducer 202, as well as to drive the second MEMS transducer 202, i.e., move one or more mobile masses (not illustrated) of the second MEMS transducer 202.

The DSP stage 215 receives at input the output signal $s_{out}$ and the additional output signal $s'_{out}$; moreover, the computational resources provided by the first, second, third, and fourth DSP units 14, 214, 314, 414 can be used in a variable way, according (for example) to the value of the directly writeable configuration parameter.

For instance, when the directly writeable configuration parameter has the initial value, the first and second DSP units 14, 214 receive at input the output signal $s_{out}$, on the basis of which they generate, respectively, a first second preliminary signal $ss_{proc1}$ and a second preliminary signal $ss_{proc2}$, whereas the third and fourth DSP units 314, 414 receive at input the additional output signal $s'_{out}$, on the basis of which they generate a third preliminary signal $ss_{proc1}$ and a fourth preliminary signal $ss_{proc2}$, respectively. The outputs of the first, second, third, and fourth DSP units 14, 214, 314, 414 can be multiplexed (for example, on a same bus) on the output of the DSP stage 215, which is connected to the inputs of the advanced-processing stage 118 and of the memory stage 16, as well as to the interface module 9. Consequently, if we denote by "overall signal $s_{proc}x$" the signal present on the output of the DSP stage 215, the overall signal $s_{proc}x$ includes the first, second, third, and fourth preliminary signals $ss_{proc}1$-$ss_{proc4}$. The memory stage 16 and the advanced-processing stage 118 are controlled by the controller 12 so as to be able, respectively, to store and process one or more from among the first, second, third, and fourth preliminary signals $ss_{proc}1$-$ss_{proc4}$, starting from the overall signal $s_{proc}x$, in the same as has been described as regards the processed signal $s_{proc}$ with reference to FIGS. 1 and 2.

The controller 12 can moreover temporarily disable one or more of the first, second, third, and fourth DSP units 14, 214, 314, 414 and/or can change routing of the output signal $s_{out}$ and of the additional output signal $s'_{out}$ towards the first, second, third, and fourth DSP units 14, 214, 314, 414 according to the value of the directly writeable configuration parameter, and therefore as a function of the detections made by the advanced-processing stage 118, which, as explained previously, may comprise detections of operating conditions and of gestures. In this way, each one from among the first, second, third, and fourth DSP units 14, 214, 314, 414 can carry out its own processing on either the output signal $s_{out}$ or the additional output signal $s'_{out}$. Purely by way of example, when the directly writeable configuration parameter assumes the updated value, the controller 12 may disable the third and fourth DSP units 314, 414. In practice, the computational power of the DSP stage 215 is allocated in an automatic way according to the real needs, without involving the microcontroller unit 5.

In addition, in the embodiment illustrated in FIG. 3, the controller 12 may be configured to activate/deactivate each one of the first and second MEMS transducers 2, 202 according to the value of the directly writeable configuration parameter.

The advantages that the present solution affords emerge clearly from the foregoing description. In fact, the present interface electronic circuit is able to reconfigure itself automatically according the data detected by the sensor, without any need for intervention by the microcontroller unit, with consequent reduction in the consumption levels of the microcontroller unit and in the circuit complexity. In particular, the advanced-processing stage 118 manages the algorithms that are executed continuously in time, for example to adapt the configuration of the sensor in an optimal way, thus reducing the number of times in which the microcontroller unit has to be woken up and set in operation.

In addition, the present solution enables reduction of the times necessary for modifying the configuration parameters, which would be lengthened in the event of intervention of the microcontroller unit, in particular in the case of adoption of an insufficiently fast communication protocol between the interface module and the microcontroller unit. Furthermore, the present solution enables reduction of congestion on the communication bus present between microcontroller unit and the interface module. Again, the present solution can be applied also in the case of synchronous systems, i.e., systems in which the microcontroller unit 5 does not have the possibility of managing interrupt lines and performs timed accesses. Finally, the present solution is applicable also in the case of systems in which two or more sensors share a same interrupt terminal of the microcontroller unit.

Finally, it is clear that, as mentioned previously, modifications and variations may be made to what has been described and illustrated herein, without departing from the scope of the present disclosure, as defined in the annexed claims.

For instance, the number of registers 10 directly accessible to the advanced-processing stage 118, and therefore the number of configuration parameters that can be written directly by the latter, may be greater than one. Moreover, the controller 12 may set, according to the value of each of the directly writeable configuration parameters, at least one corresponding reconfigurable characteristic of the sensor, which is chosen, for example, from one of the following: the type of processing executed by the advanced-processing stage 118; switching-on/switching-off of one or more MEMS transducers coupled to the interface electronic circuit; activation/deactivation of the memory stage; activation of low-power or normal operating modes; one or more parameters of the processing operations performed by the DSP unit, such as the values of one or more filtering bands of processing algorithms implemented by the DSP unit and/or the corresponding full-scale values and/or the sample-output rates of the signals obtained via the aforesaid algorithms.

In addition, the advanced-processing stage may differ from what has been described; in general, it is designed to detect occurrence of at least one target condition on the basis of at least one processed signal supplied by a DSP unit. The target condition regards at least one quantity detected by at least one MEMS transducer; for example, the target condition occurs when the quantity follows in time a pre-set evolution or when the evolution of the quantity in time presents characteristics regarding a corresponding class of a classification system.

An interface electronic circuit couplable to a first transducer (2) configured to generate a first analog signal ($s_{analog}$) indicative of a first quantity and to a microcontroller unit (5), said interface electronic circuit (103; 203) may be summarized as including a first conversion stage (4) configured to generate a first digital signal ($s_{out}$) as a function of the first analog signal ($s_{analog}$); a DSP stage (215) including at least one DSP unit (14) and configured to generate a processed signal ($s_{proc}$; $s_{proc}$x) as a function of the first digital signal ($s_{out}$); an advanced-processing stage (118) configured to detect, by executing a processing of the processed signal ($s_{proc}$; $s_{prox}$), the occurrence of a target condition relating to said first quantity; and a number of registers (10) configured to store values of configuration parameters; and wherein the advanced-processing stage (118) is configured to write at least one subset of the registers (10), after having detected the occurrence of said target condition, so as to vary the values of the configuration parameters stored in said subset of registers (10).

The advanced-processing stage (118) may be configured to carry out at least one processing operation from between implementing at least one finite-state machine, on the basis of the processed signal ($s_{proc}$; $s_{prox}$), for detecting execution of a gesture by the first transducer (2); or implementing at least one machine-learning algorithm trained for classifying an operating condition of the first transducer (2), on the basis of the first processed signal ($s_{proc}$; $s_{prox}$).

The controller (12) may be configured to change said at least one processing executed by the advanced-processing stage (118) as a function of the value of at least one of the configuration parameters stored in said subset of registers (10).

The DSP unit (14) may be configured to carry out a respective processing of the first digital signal ($s_{out}$); and wherein the controller (12) may be configured to change said respective processing of the first digital signal ($s_{out}$) as a function of the value of at least one of the configuration parameters stored in said subset of registers (10).

The interface electronic circuit may further include a memory stage (16) configured to store samples of the processed signal ($s_{proc}$; $s_{proc}$x); and wherein the controller (12) is configured to activate/deactivate the memory stage (16) as a function of the value of at least one of the configuration parameters stored in said subset of registers (10).

The interface electronic circuit furthermore couplable to a second transducer (202) configured to generate a second analog signal ($s'_{analog}$) indicative of a second quantity, said interface electronic circuit (103;203) may further include a second conversion stage (204) configured to generate a second digital signal ($s'_{out}$) as a function of the second analog signal ($s'_{analog}$); and wherein the DSP stage (215) includes a plurality of DSP units (14, 214, 314, 414); and wherein the controller (12) controls each DSP unit (14; 214; 314; 414) so that it receives at input alternatively the first or the second digital signal ($s_{out}$, $s'_{out}$), as a function of the value of at least one of the configuration parameters stored in said subset of registers (10).

The controller (12) may be further configured to enable/disable each DSP unit (14; 214; 314; 414) as a function of the value of at least one of the configuration parameters stored in said subset of registers (10).

The interface electronic circuit may further include an interface module (9) configured to co-operate with the microcontroller unit (5) to enable the microcontroller unit (5) to write said registers (10); and wherein the advanced-processing stage (118) is configured to write directly said subset of registers (10).

A sensor may be summarized as including an interface electronic circuit (103; 203) according to any one of the preceding claims; and said first transducer (2), which is of a MEMS type.

A system may be summarized as including the sensor (101; 201) and said microcontroller unit (5).

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An interface electronic circuit, said interface electronic circuit comprising:
a first conversion stage configured to generate a first digital signal as a function of a first analog signal of a first transducer, the first analog signal indicative of a first quantity;
a DSP stage including at least one DSP unit and configured to generate a processed signal as a function of the first digital signal;
a number of registers configured to store values of configuration parameters; and an advanced-processing stage configured to detect, based on the processed signal, occurrence of a target condition relating to said first quantity, and to vary the values of the configuration parameters by writing to at least a subset of the registers, after having detected the occurrence of said target condition.

2. The interface electronic circuit according to claim 1, wherein the advanced-processing stage is configured to carry out at least one processing operation of:
implementing at least one finite-state machine, based on the processed signal, for detecting a gesture based on the first analog signal of the first transducer; or
implementing at least one machine-learning algorithm trained for classifying an operating condition of the first transducer, based on the first processed signal.

3. The interface electronic circuit according to claim 2, wherein the advanced-processing stage is configured to change said at least one processing operation executed by the advanced-processing stage as a function of a value of at least one of the configuration parameters stored in said subset of registers.

4. The interface electronic circuit according to claim 1, wherein the DSP unit is configured to carry out a respective processing of the first digital signal; and wherein a controller is configured to change said respective processing of the first digital signal as a function of a value of at least one of configuration parameters stored in said subset of registers.

5. The interface electronic circuit according to claim 1, further comprising a memory stage configured to store samples of the processed signal; and wherein a controller is configured to activate or deactivate the memory stage as a function of a value of at least one of the configuration parameters stored in said subset of registers.

6. The interface electronic circuit according to claim 1, further couplable to a second transducer configured to generate a second analog signal indicative of a second quantity, said interface electronic circuit further comprising a second conversion stage configured to generate a second digital signal as a function of the second analog signal;
wherein the DSP stage comprises a plurality of DSP units; and
wherein a controller controls each DSP unit to receive as input alternatively the first or the second digital signal, based on a value of at least one of the configuration parameters stored in said subset of registers.

7. The interface electronic circuit according to claim 6, wherein the controller is further configured to enable or disable each DSP unit based on the value of the at least one of the configuration parameters stored in said subset of registers.

8. The interface electronic circuit according to claim 1, further comprising an interface module configured to communicate with a microcontroller unit to enable the microcontroller unit to write to said registers; and wherein the advanced-processing stage is configured to write directly to said subset of registers.

9. A sensor system, comprising:
a first transducer configured to generate a first analog signal indicative of a first quantity;
an interface electronic circuit electronically coupled to the first transducer, the interface electronic circuit comprising:
a first conversion stage configured to generate a first digital signal based on the first analog signal;
a DSP stage including a DSP unit and configured to generate a processed signal as based on the first digital signal;
a register configured to store a value of a configuration parameter; and
an advanced-processing stage configured to determine, based on the processed signal, an operation state of the first transducer, and to vary the value of the configuration parameter based on the operation state.

10. The sensor system according to claim 9, wherein the advanced-processing stage is configured to implement a machine-learning algorithm trained for classifying an operation state of the first transducer, based on the first processed signal.

11. The sensor system according to claim 10, wherein a controller is configured to change the machine-learning algorithm based on the value of the configuration parameter.

12. The sensor system according to claim 9, wherein the DSP unit is configured to process the first digital signal; and
wherein a controller is configured to change the processing of the first digital signal based on the value of the configuration parameter.

13. The sensor system according to claim 9, further comprising a memory stage configured to store a sample of the processed signal; and
wherein a controller is configured to activate or deactivate the memory stage based on the value of the configuration parameter.

14. The sensor system according to claim 9, further comprising a second transducer coupled to the interface electronic circuit, the second transducer configured to generate a second analog signal indicative of a second quantity,
wherein the interface electronic circuit further comprises a second conversion stage configured to generate a second digital signal based on the second analog signal;
wherein the DSP stage comprises a plurality of DSP units; and
wherein a controller controls each DSP unit of the DSP stage to receive as input alternatively the first or the second digital signal, based on the value of the configuration parameter.

15. The sensor system according to claim 14, wherein the controller is further configured to enable or disable each DSP unit based on the value the configuration parameter.

16. The sensor system according to claim 9, comprising a microcontroller unit coupled to the interface electronic circuit,
wherein the interface electronic circuit includes an interface module configured to communicate with the microcontroller unit to enable the microcontroller unit to write to the register.

17. The sensor system of claim 16, wherein the advanced-processing stage is configured to write to the register directly and independent of the microcontroller unit.

18. A method, comprising:
generating, by a first transducer, a first analog signal indicative of a first quantity;
generating, by a first conversion stage of an interface electronic circuit electronically coupled to the first transducer, a first digital signal based on the first analog signal;
generating, by a DSP stage of the interface electronic circuit, a processed signal as based on the first digital signal, wherein the DSP stage includes a DSP unit;
storing, by a register of the interface electronic circuit, a value of a configuration parameter;
determining, by an advanced-processing stage of the interface electronic circuit, an operation state of the first transducer based on the processed signal;

varying, by the advanced-processing stage, the value of the configuration parameter based on the operation state of the first transducer; and configuring a controller of the first transducer based on the value of the configuration parameter.

19. The method according to claim 18, wherein the controller controls a digital signal processing unit for processing a signal of the first transducer based on the configuration parameter.

* * * * *